(12) United States Patent
Daskalopoulos et al.

(10) Patent No.: US 8,001,379 B2
(45) Date of Patent: Aug. 16, 2011

(54) CREDENTIAL GENERATION SYSTEM AND METHOD FOR COMMUNICATIONS DEVICES AND DEVICE MANAGEMENT SERVERS

(75) Inventors: Vasilios Daskalopoulos, Edison, NJ (US); Badri Nath, Edison, NJ (US); Rakesh Kushwaha, Marlboro, NJ (US)

(73) Assignee: Mformation Technologies Inc., Edison, NJ (US)

( * ) Notice: Subject to any disclaimer, the term of this patent is extended or adjusted under 35 U.S.C. 154(b) by 662 days.

(21) Appl. No.: 12/055,752

(22) Filed: Mar. 26, 2008

(65) Prior Publication Data
US 2009/0249069 A1 Oct. 1, 2009

(51) Int. Cl.
*H04L 9/00* (2006.01)
*H04L 9/32* (2006.01)

(52) U.S. Cl. ............... 713/168; 713/169; 726/2; 726/5

(58) Field of Classification Search ............ 713/150, 713/155, 168–170, 186, 181–184; 726/2–6, 726/17–21; 380/44
See application file for complete search history.

(56) References Cited

U.S. PATENT DOCUMENTS

| 5,535,276 | A | * | 7/1996 | Ganesan | 713/155 |
| 5,872,917 | A | * | 2/1999 | Hellman | 726/6 |
| 6,128,742 | A | | 10/2000 | Felt | |

* cited by examiner

*Primary Examiner* — Hosuk Song
(74) *Attorney, Agent, or Firm* — Brosemer, Kolefas & Associates

(57) ABSTRACT

Systems and methods are described for establishing credentials at a device and at a device management server for the purpose of exchanging secure credentials in order to mutually authenticate the device and the server. A credential generation algorithm is described which uses a plurality of seeds, including the hardware identity of the device, the server identity, and a shared private key, to generate two sets of credentials, one to be used by the device and the other to be used by the device management server. The credentials are exchanged between the device and the server during any session, thereby assuring mutual authentication.

32 Claims, 5 Drawing Sheets

MANAGEMENT SERVER (SERVERID)

| DEVID | DEVICE PASSWORD | SERVER PASSWORD |
|-------|-----------------|-----------------|
| D1    | DPX1            | SPX1            |
| D2    | DPX2            | SPX2            |
| ...   | ...             | ...             |

*FIG. 3*

CREDENTIAL GENERATION SYSTEM AND METHOD FOR COMMUNICATIONS DEVICES AND DEVICE MANAGEMENT SERVERS

FIELD OF THE INVENTION

The present invention relates to security systems and methods for communications devices, particularly for mutually authenticating devices and servers for purposes of interacting, such as in a device management session or the like.

BACKGROUND INFORMATION

Many communications devices, both wireless and wired, have the capability of being remotely managed by a device management server. A typical device management server can remotely configure devices, send updates, and perform diagnostics. Without remote management over a network, a device would need to be brought to a service center, or the like, in order to carry out many management actions. This is time consuming, inconvenient, and costly. Hence, it is desirable for devices that operate in a network environment to support features for remote device management. To this end, each communications service provider typically operates its own device management server which is capable of managing the devices that operate on its network.

For a device to be remotely managed, it needs to securely interact with a management server in a management session. Typically, to initiate such an interaction, the device presents a password (the "device password") to the management server that the server can verify to authenticate the device, and the management server presents a password (the "server password") to the device that the device can verify to authenticate the server. This ensures mutual authentication prior to starting a management session.

Service providers typically obtain the devices used on their networks from Original Equipment manufacturers or OEMs. These devices are then sold to customers of the service providers. The passwords required for remote management of devices are typically communicated by out-of-band means (e.g., mail) to the customers, who then enter the passwords into their respective devices. In addition to programming each device with its device password, each device must also be programmed with the server passwords of the management servers with which it is to interact.

This process, however, is error prone, compromises security, and depends on users to enter data before using their devices. Moreover, it does not address the issue of providing the device passwords to the device management servers. In addition, changes in server passwords will require re-programming of the devices with the new server passwords.

The need exists, therefore, for improved systems and methods of providing communications devices and device management servers with the relevant credentials needed to carry out management sessions.

SUMMARY OF THE INVENTION

The present invention provides systems and methods that overcome the above-described disadvantages of known approaches by, among other things, eliminating the need for out-of-band communication of passwords to users as well as user input of passwords into devices.

In an aspect of the present invention, systems and methods are disclosed for mutually authenticating a remotely managed device and a device management server when the device and server interact, such as in a device management session.

In an exemplary embodiment, a device password is generated based on the identity of the device. The device password is presented by the device to the server in order to authenticate the device to the server. In addition to being based on the identity of the device, the device password may also be based on additional parameters, such as the identity of the management server and service provider deploying the device in its network. This ensures that there is one password unique to each device and each device can be authenticated independently at the server. A similar method can be used independently at the server to generate the same device password from the same parameters, so that the server can verify the password provided by the device when the device interacts with the server.

Similarly, in an exemplary embodiment, a server password is generated based on the identity of the server. The server password is presented by the server to the device in order to authenticate the server to the device. In addition to being based on the identity of the server, the server password may also be based on additional parameters, such as the identity of the device and the service provider deploying the device in its network. A similar method can be used independently at the device to generate the same server password from the same parameters, so that the device can verify the password provided by the server when the server interacts with the device.

In an exemplary embodiment, the present invention provides methods and apparatus for generating pairs of device-specific and server-specific passwords independently at the device and at the server without prior communication of the actual credentials so that they can be mutually verified when any session between the two is initiated. Each pair of passwords includes a device password (for presentation by the device to the server for authentication of the device to the server) and a server password (for presentation by the server to the device for authentication of the server to the device). The device and server passwords can be generated using the same function and the same parameters, including, for example, a unique identifier of the device, a unique identifier of the server, and a shared key. In an exemplary embodiment, the parameters are concatenated in different orders to generate the two different passwords of each pair. Thus, a pair of device and server passwords unique to each pair of device and server can be generated by the same method and used to mutually authenticate a device and a management server.

In an exemplary embodiment of the present invention, a password generating function is programmed into a device and a device and server password pair is generated at the device using parameters such as those mentioned above. In another exemplary embodiment, the password pair is programmed into the device. Such programming can be done at the factory or at some point before the devices are provided to the customers.

The password pairs that are generated in accordance with the present invention are preferably service-provider-specific. In an exemplary embodiment of the present invention, a method is provided by which the password generating function can be further parameterized with a service provider identity so that a unique password for each device and the service provider can be generated. Thus, a set of devices can be configured with passwords that are valid for that particular service provider network. To operate in another service provider network, the device will require a new password that is generated based on the identity of the new service provider.

In a further exemplary embodiment of the present invention, a mechanism is provided by which the same password generating function is used for the device and the device management server. The password generating function uses the same set of parameters but the order is changed at the server so that different passwords are generated for the device and the server. The two passwords are exchanged by the server and device and verified by one another.

In a further exemplary embodiment the same process can be used to generate other credentials such as user name and nonce, a temporary sequence number that prevents replay attacks.

The above and other aspects and features of the present invention will be apparent from the drawings and detailed description which follow.

BRIEF DESCRIPTION OF THE DRAWINGS

FIG. 3 shows an exemplary table maintained at a device management server for storing the device password and the server password for each device that can initiate a management session.

DETAILED DESCRIPTION

Figure 1:
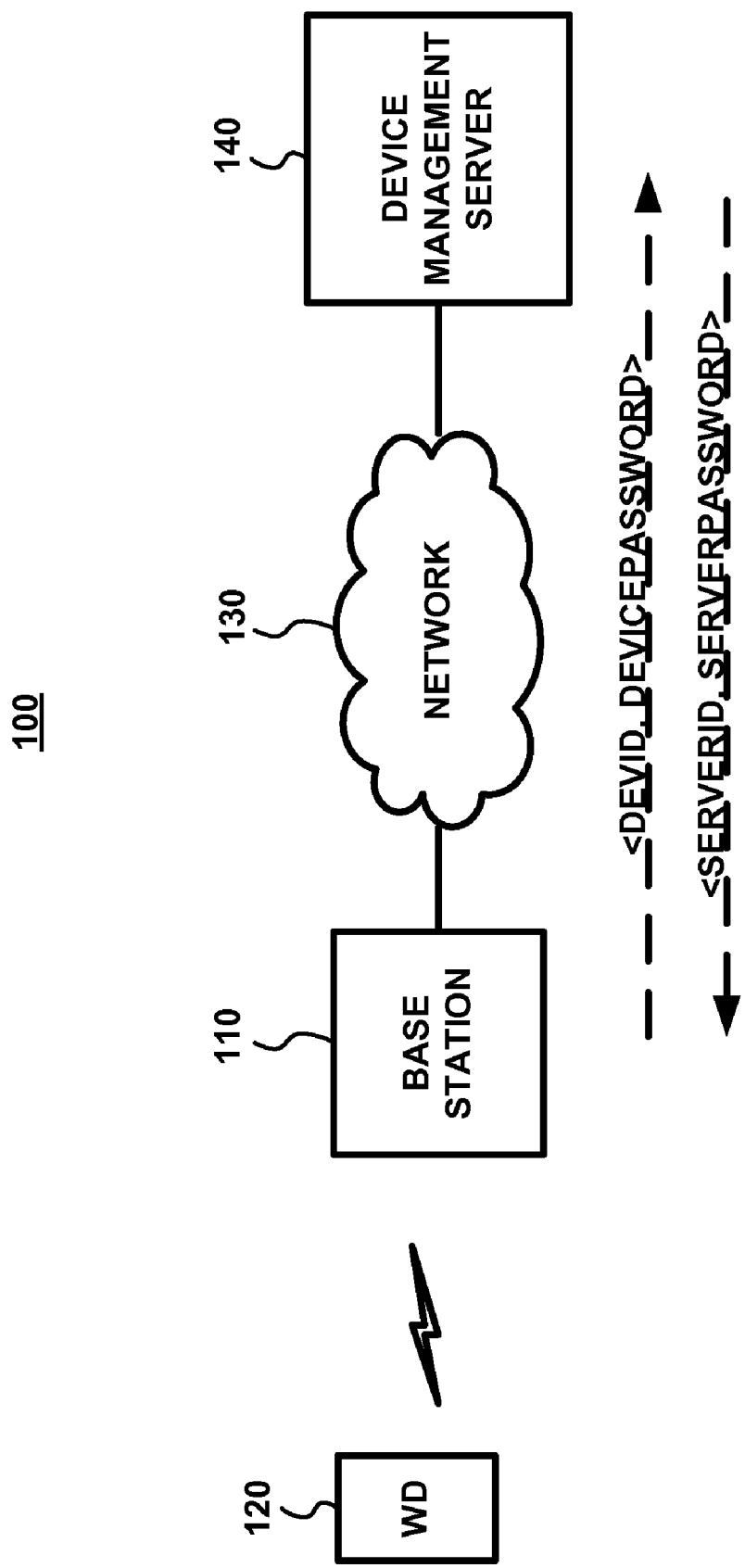
FIG. 1 illustrates the exchange of device password and server password between a device and a device management server in accordance with an exemplary embodiment of the present invention.

FIG. 1 shows an exemplary wireless network 100 for use with the present invention. The network 100 comprises a conventional radio access network with one or more base stations or wireless access points 110 that can communicate with one or more wireless devices 120. As shown in FIG. 1, the base station 110 is coupled to a backbone. Additionally, one or more servers, such as a device management server 140, are also coupled to the network 130 and can interact with the device 120 via the base station 110 and the network 130.

The wireless technology employed by the network 100 can be any of the schemes available to communicate wirelessly with a device, including, for example, code division multiple access (CDMA), general packet radio service (GPRS), WiFi, WiMax, universal mobile telecommunications system (UMTS), and long term evolution (LTE), among others. The present invention can be applied to any arrangement calling for mutual authentication of two interacting entities, such as a wireless device that is remotely managed by a device management server.

In remotely managing the device 120, the management server 140 initiates certain actions that result in messages being sent to a client on the device 120. Client software running on the device 120 can effect changes to the device based on management commands sent from the server 140. Management commands may include, for example, configuration, software management, diagnostics, and security commands, among others. The client/server interaction may follow any of a variety of known standards, such as the Open Mobile Alliance device management, TR-69 of the DSL forum, or DOCSIS of Cablelabs, or it may follow a proprietary protocol.

For the device and the management server to securely interact, the device should be authenticated to the server. Similarly, the device should also be able to verify the authenticity of the management server to ensure that it is not receiving commands from a rogue server. In order to facilitate such mutual authentication, when the device 120 connects to the management server 140, the device can present a credential in the form of a password (DEVICEPASSWORD) along with some appropriate device identifier (DEVID), as illustrated in FIG. 1. The server 140 can verify the password received from the device 120 by comparing it to the password that it expects for the device. The server 140 can, for example, maintain a database of device identifiers and corresponding device passwords for the multiple devices that it manages, or as described below, it can generate the corresponding device passwords using the device identifiers and other information, among other possible arrangements.

Similarly, as part of the mutual authentication between the device 120 and the management server 140, the management server can send its password (SERVERPASSWORD) along with some appropriate server identifier (SERVERID) to the device. The device can verify the authenticity of the server by comparing the password that it receives from the server to the password that it has for the server. The identifiers of one or more servers with which the device 120 will interact and their corresponding passwords can be, for example, pre-programmed into the device, or as described below, the device can generate the corresponding server passwords using the server identifiers and other information, among other possible arrangements.

In an exemplary embodiment, the present invention provides a method to generate the aforementioned device and server passwords independently, such as at a device and a server that are to be mutually authenticated to each other. In an exemplary embodiment of the present invention, a cryptographic hash function is used for this purpose. The hash function takes three parameters as input. One of the parameters used is the hardware identity of the device, including, for example, the electronic serial number (ESN), mobile equipment identifier (MEID), international mobile equipment identity (IMEI), media access control (MAC) address of the device, or any other valid hardware identity. A second parameter used by the exemplary password generating function is a server identifier which could be a URL or any identity that uniquely identifies the server. A third parameter is a private key associated with the service provider. Using these three parameters allows the hash function to generate a device-specific and a server-specific device password. This ensures that a given device can be authenticated against a specific server. Similarly, the same function and parameters can be used to generate a device-specific and a server-specific server password, so that a given server can be authenticated against a specific device. Moreover, using the aforementioned private key as a parameter in the generation of the device and server passwords makes them service-provider-specific.

Figure 2:
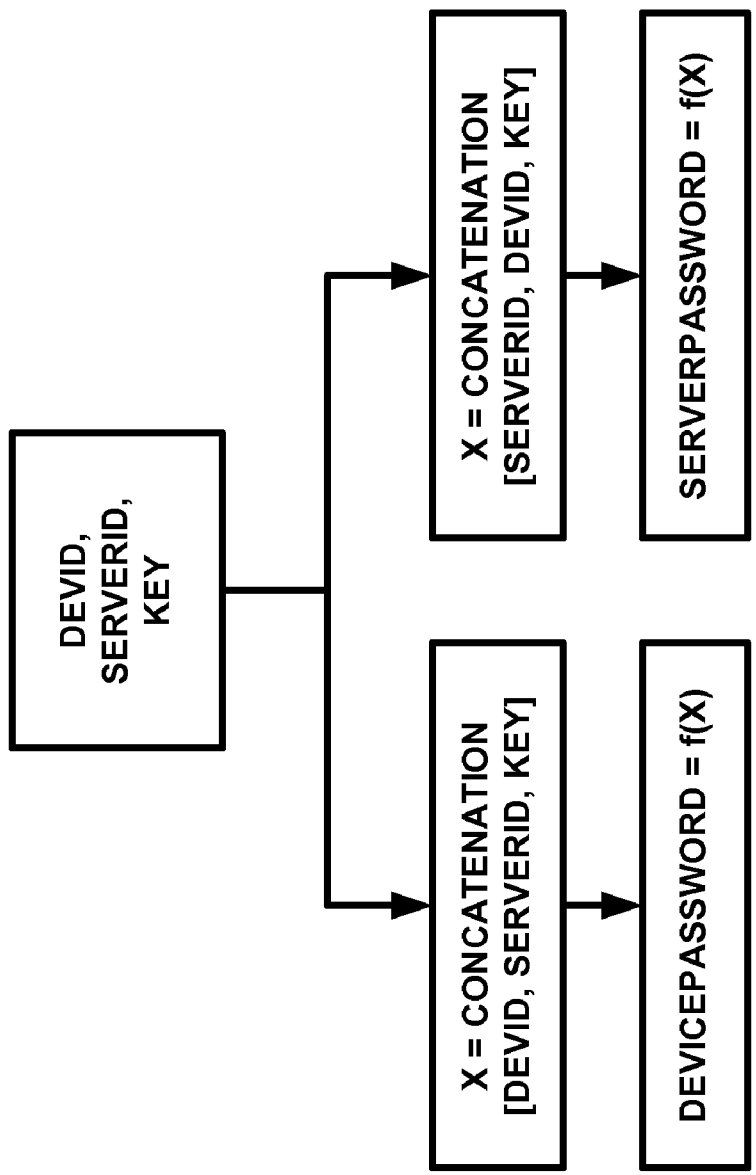
FIG. 2 illustrates an exemplary process for generating both a device password and a server password using the same password generating function.

FIG. 2 shows a graphical representation of an exemplary method of generating the device and server passwords in accordance with the present invention. Using the same three parameters, the same cryptographic function f(X) is used to generate both the device and server passwords used to mutually authenticate a server and a device. As shown in FIG. 2, DEVICEPASSWORD is generated by applying the function f(X) to the concatenation of the three parameters, DEVID, SERVERID, and KEY. SERVERPASSWORD is generated by applying the same function f(X) to the concatenation of the same three parameters, but in the order SERVERID, DEVID, and KEY. Note that other parameter orders can be used, so long as the orders are consistent at the device and the server.

In an exemplary embodiment, the cryptographic function f(X) can be any of the well known one-way hash functions such as MD5 (Message Digest).

In an exemplary embodiment, the device is programmed with the password-generating function and generates a server and device password pair for each server with which the device is to interact and engage in mutual authentication. In such an embodiment, the device would be provided with the password-generating function f(X), the SERVERID (or SERVERIDs if the device is to interact with multiple device management servers), and the KEY associated with the service provider. Of course, the device will already know its own DEVID. The password pairs can be generated or updated, for example, upon device activation, in preparation for a management session, in response to device management commands, or upon the occurrence of other events, such as for example, device software loading in the factory or password expiry.

In an alternative embodiment, a pair of passwords generated in accordance with the method illustrated in FIG. 2 is provisioned into each device. The provisioning of the passwords can be carried out in a variety of ways, including, for example, hard-coding the passwords into the device, or programming them into non-volatile memory of the device, or the like. This can be done, for example, by the device manufacturer or the service provider.

Because the pair of passwords is service-provider-specific, if the service provider associated with the device changes, the passwords provisioned in the device are rendered invalid. In order to interact with the device management server(s) of the new service provider, the device will need to be provisioned with a new pair (or pairs) of passwords. Where the device generates the passwords itself, the device would need to be provided with the private key of the new service provider. Furthermore, the new service provider may use a different password-generating function in which case that would also need to be provided to the device.

Similar considerations regarding the provisioning of passwords and/or password-generating functions also apply to the server. Moreover, the server will typically interact with many more devices than devices will interact with servers.

FIG. 3 shows an exemplary arrangement for storing password pairs at a management server for devices managed by the server. For each device, a table contains the DEVICE-PASSWORD and SERVERPASSWORD generated as described above. Each password pair is indexed by the device identifier (DEVID) of the corresponding device. The password information can be generated by the service provider or device manufacturer, for example, as described above, and provided to the management server, or it may be generated independently by the management server using the same cryptographic function f(X) and parameters. The password pair for a device may be generated, for example, whenever the device is put into service or assigned to the server. Alternatively, the server can generate the password pair for a device as needed, for example, upon an attempt to initiate a session with the device. In that case, the server need not maintain a table of passwords, such as that of FIG. 3.

In operation, when a device connects to the server, it presents its device identifier (e.g., D1) and its DEVICEPASSWORD (e.g., DPX1). The server checks the password received from the device against the device's corresponding table entry. (Alternatively, the server can use the password-generating function to generate the expected DEVICEPASSWORD for the device.) If there is a match, the device is authenticated and the management session is allowed to proceed. The server then retrieves the SERVERPASSWORD corresponding to the device (D1)—which in this case is SPX1—and provides it to the device. (Alternatively, the server can use the password-generating function to generate the expected SERVERPASSWORD for the device.) If SPX1 corresponds to the SERVERPASSWORD expected by the device—namely, the SERVERPASSWORD that was generated as described above—then the server is authenticated to the device and the device can proceed with the session, knowing that it is interacting with a legitimate server.

Figure 4:
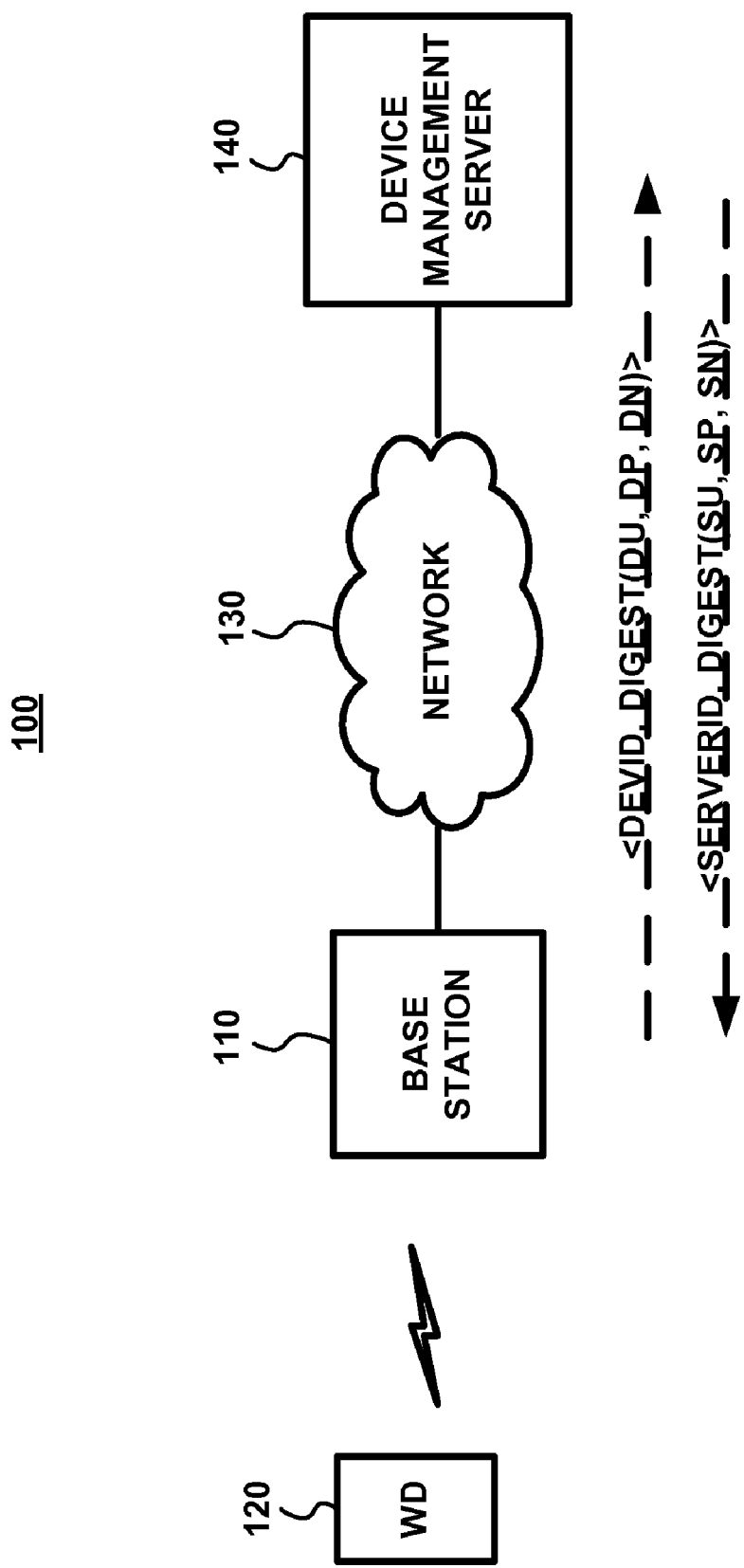
FIG. 4 illustrates the exchange of credentials between a device and a device management server in accordance with an exemplary embodiment of the present invention.

FIG. 4 illustrates a further mutual authentication scheme in accordance with the present invention. When the device 120 connects to the management server 140, the device can present a credential in the form of a digest of device parameters along with its device identifier (DEVID), as illustrated in FIG. 4. The server 140 can verify the credentials received from the device 120 by comparing it to the credentials that it expects for the device. The server 140 can, for example, maintain a database of device identifiers and corresponding credentials for the multiple devices that it manages, or as described below, it can generate the corresponding device credentials using the device identifiers and other information, among other possible arrangements.

In the exemplary embodiment of FIG. 4, the device sends a digest of a device username (DU), a device password (DP), and a device nonce (DN). The device username and password may be selected, for example, by the device user or assigned by the service provider. The device nonce can be a temporary sequence number, such as a time stamp or the like, which serves to prevent replay attacks. In an exemplary embodiment, the digest of DU, DP, and DN is a hash generated based on MD5.

Similarly, as part of the mutual authentication between the device 120 and the management server 140, the management server can present a credential in the form of a digest of server parameters along with its server identifier (SERVERID) to the device. The device can verify the authenticity of the server by comparing the credentials that it receives from the server to the credentials that it has for the server. The identifiers of one or more servers with which the device 120 will interact and their corresponding credentials can be, for example, pre-programmed into the device, or as described below, the device can generate the corresponding server credentials using the server identifiers and other information, among other possible arrangements.

In the exemplary embodiment of FIG. 4, the server sends a digest of a server username (SU), a server password (SP), and a server nonce (SN). The server nonce can be a temporary sequence number, such as a time stamp or the like, which serves to prevent replay attacks. In an exemplary embodiment, the digest of SU, SP, and SN is a hash generated based on MD5.

Figure 5:
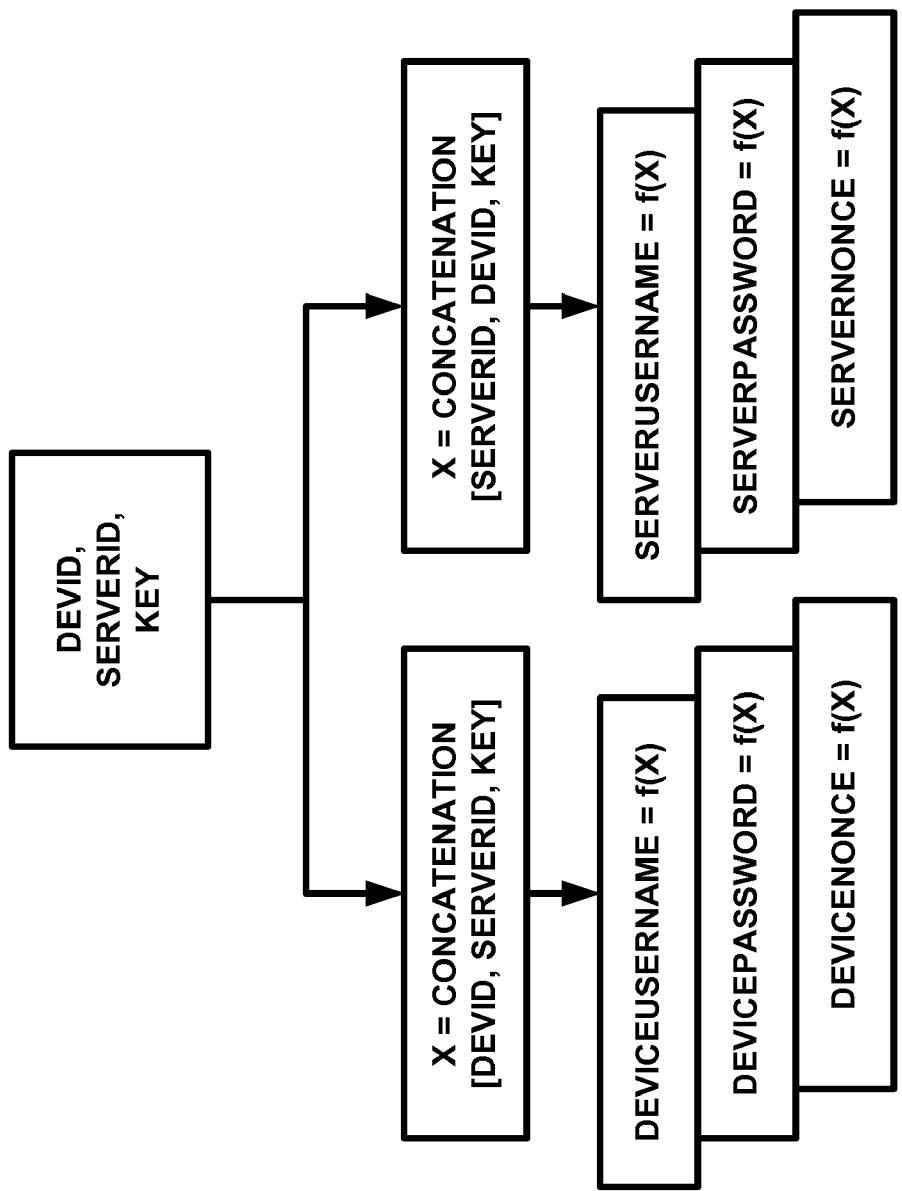
FIG. 5 illustrates an exemplary process for generating device and server credentials using the same credential generating function.

FIG. 5 shows a graphical representation of an exemplary method of generating the device and server credentials in accordance with the present invention. Using the same three parameters, the same cryptographic function f(X) is used to generate both the device and server credentials used to mutually authenticate a server and a device. The function f(X) returns a vector of values based on the order and values of the input parameters. The first component of this vector is the username, the second component is the password and the third component is the nonce. As shown in FIG. 5, the device values, DEVICEUSERNAME, DEVICEPASSWORD and DEVICENONCE are generated by applying the function f(X) to the concatenation of the three parameters, DEVID, SERVERID, and KEY. The server values, SERVERUSER- NAME, SERVERPASSWORD and SERVERNONCE are generated by applying the same function f(X) to the concatenation of the same three parameters, but in the order SERVERID, DEVID, and KEY. Note that other parameter orders can be used, so long as the orders are consistent at the device and the server.

Note that the DEVICENONCE and SERVERNONCE values generated as described above are initial values for a given device/server session. As the session progresses, the nonce values can be changed, such as by the use of a NextNonce message or the like.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of mutually authenticating a communications device and a server, the method comprising:
   generating with the communications device first and second credentials;
   generating with the server third and fourth credentials;
   providing the first credential from the communications device to the server;
   providing the fourth credential from the server to the communications device;
   authenticating the communications device when the first credential matches the third credential; and
   authenticating the server when the fourth credential matches the second credential,
   wherein the communications device and the server use the same function to generate the credentials, the function using a unique identifier of the communications device including at least one of an electronic serial number (ESN), mobile equipment identifier (MEID), international mobile equipment identity (IMEI), and a media access control (MAC) address of the communications device.

2. The method of claim 1, wherein at least one of the credentials includes a password.

3. The method of claim 1, wherein at least one of the credentials includes a digest of a plurality of parameters.

4. The method of claim 3, wherein the plurality of parameters includes a username, a password, and a nonce.

5. The method of claim 1, wherein the credentials are unique to the communications device.

6. The method of claim 1, wherein the credentials are unique to the server.

7. The method of claim 1, wherein the credentials are unique to a service provider.

8. The method of claim 1 comprising:
   providing the unique identifier of the communications device from the communications device to the server; and
   providing a unique identifier of the server from the server to the communications device;
   wherein the first and second credentials are generated by the communications device as a function of the unique identifiers of the communications device and the server, and the third and fourth credentials are generated by the server as a function of the unique identifiers of the communications device and the server.

9. A method of mutually authenticating a communications device and a server, the method comprising:
   generating with the communications device first and second credentials;
   generating with the server third and fourth credentials;
   providing the first credential from the communications device to the server;
   providing the fourth credential from the server to the communications device;
   authenticating the communications device when the first credential matches the third credential; and
   authenticating the server when the fourth credential matches the second credential,
   wherein the communications device and the server use the same function to generate the credentials, the function including a one-way hash function which uses at least two parameters, the first and third credentials being generated with the at least two parameters arranged in a first order, and the second and fourth credentials being generated with the at least two parameters arranged in a second order.

10. The method of claim 9, wherein the one-way hash function which uses at least three parameters including a private key.

11. The method of claim 10, wherein the private key is unique to a service provider.

12. The method of claim 9, wherein the credentials are unique to the communications device.

13. The method of claim 9, wherein the credentials are unique to the server.

14. The method of claim 9, wherein the credentials are unique to a service provider.

15. The method of claim 9, wherein the function uses a unique identifier of the communications device.

16. The method of claim 9, wherein at least one of the credentials includes a password.

17. The method of claim 9, wherein at least one of the credentials includes a digest of a plurality of parameters.

18. The method of claim 17, wherein the plurality of parameters includes a username, a password, and a nonce.

19. The method of claim 9 comprising:
   providing a first of the at least two parameters from the communications device to the server; and
   providing a second of the at least two parameters from the server to the communications device;
   wherein the first and second credentials are generated by the communications device as a function of the first and second parameters, and the third and fourth credentials are generated by the server as a function of the first and second parameters.

20. The method of claim 19, wherein the first parameter includes a unique identifier of the communications device and the second parameter includes a unique identifier of the server.

21. A method of mutually authenticating a communications device and a device management server, the method comprising:
   generating with the communications device first and second credentials;
   generating with the device management server third and fourth credentials;
   providing the first credential from the communications device to the device management server;
   providing the fourth credential from the device management server to the communications device;
   authenticating the communications device when the first credential matches the third credential;
   authenticating the device management server when the fourth credential matches the second credential; and conducting a remote management session after the communications device and device management server are mutually authenticated.

22. The method of claim 21, wherein the device management server operates in accordance with at least one standard including an Open Mobile Alliance Device management standard, a TR-69 standard, and a DOCSIS standard.

23. The method of claim 21, wherein the credentials are generated using the same function.

24. The method of claim 23, wherein the function uses a unique identifier of the communications device.

25. The method of claim 21, wherein the credentials are unique to the communications device.

26. The method of claim 21, wherein the credentials are unique to the server.

27. The method of claim 21, wherein the credentials are unique to a service provider.

28. The method of claim 21, wherein at least one of the credentials includes a password.

29. The method of claim 21, wherein at least one of the credentials includes a digest of a plurality of parameters.

30. The method of claim 29, wherein the plurality of parameters includes a username, a password, and a nonce.

31. The method of claim 21 comprising:
providing a first parameter from the communications device to the server; and
providing a second parameter from the server to the communications device;
wherein the first and second credentials are generated by the communications device as a function of the first and second parameters, and the third and fourth credentials are generated by the server as a function of the first and second parameters.

32. The method of claim 31, wherein the first parameter includes a unique identifier of the communications device and the second parameter includes a unique identifier of the server.

* * * * *